Nov. 13, 1962   H. W. MUELLER   3,063,312
COMBINED DRILL AND COUNTERSINKING TOOL
Filed Jan. 30, 1961

United States Patent Office 3,063,312
Patented Nov. 13, 1962

3,063,312
COMBINED DRILL AND COUNTERSINKING TOOL
Heinz W. Mueller, 331 E. Berkshire St., Lombard, Ill.
Filed Jan. 30, 1961, Ser. No. 85,686
9 Claims. (Cl. 77—66)

The present invention relates to improvements in attachments for twist drills, and more particularly to a countersinking, counterboring and broaching fixture therefor.

One object of the invention is to provide a countersinking fixture capable of being easily and quickly attached to a conventional twist drill in such a manner that the cutting edges of the counterboring attachment will engage the work adjacent a drilled opening after the drill has entered the workpiece a predetermined distance.

Another object is to provide a countersinking attachment for twist drills which is adjustably held in place by means of a set screw extending into the grooves of the drill and engageable with one of the lands at the sides thereof and arranged at an angle of 90° or less with respect to a plane passing through the point of contact. The set screw being arranged at a compound angle with respect to the axis of the drill and the radii intersecting the set screw.

Another object is to provide a countersinking and counterboring fixture or attachment for a twist drill having one or more cutters integrated with or separately adjustably mounted on a collar attached to the drill with the cutters extending downwardly therefrom and the lower ends received in one or more grooves of the drill on opposite sides thereof in such a manner that the tapered countersunk portion or counterbored portion of the workpiece will merge with the drilled opening without leaving a rough or feather edge at the juncture with set screws in any desired positions relative to the drills.

Another object is to provide a countersinking fixture or attachment in which a pair of separable collars are provided with one or more countersinking blades on one of their ends to accommodate twist drills of different diameter and to produce countersunk openings having various angular relation to the bore hole axis. The separable collars being threadedly, or in any other manner, connected to permit the same to be quickly and easily interchanged, or if desired, merely reversed end for end and fitted on a twist drill.

Another object resides in the provision of a countersinking attachment having depending cutter blades with the lower ends projecting into the diametrically opposite portions of the twist drill grooves and extending in a direction opposite to the direction of rotation to provide a curved cutting edge and to form end portions which fit into the diametrically opposite portions of the twist drill grooves.

Other objects and advantages of the invention will become apparent during the course of the following description of the accompanying drawing, wherein.

Figure 8:
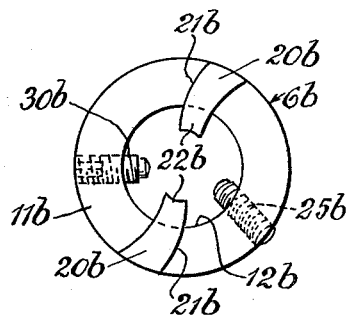
Figure 9:
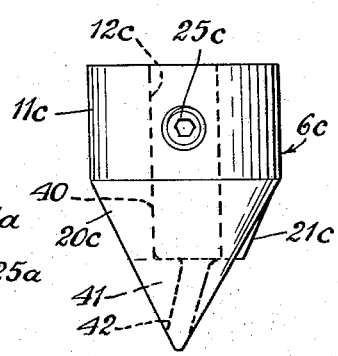

FIG. 8 is a bottom plan view of another modified form of the invention in which the counterboring cutters are helically curved in the direction opposite to the direction of rotation and are provided with concentric cutting teeth which extend into the opposed grooves of the twist drill, and FIG. 9 is a side elevational view of another modified form of the invention showing the cutting teeth in the form of an angular knob adapted to be positioned between the flutes of the twist drill.

Figure 1:
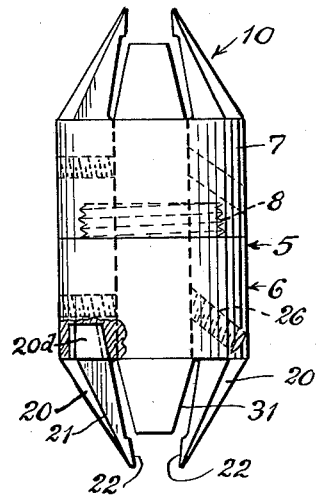
FIG. 1 is a side elevational view of a preferred embodiment of the invention showing the double ended countersinking attachment and illustrating the manner in which the same are separably connected.
Figure 2:
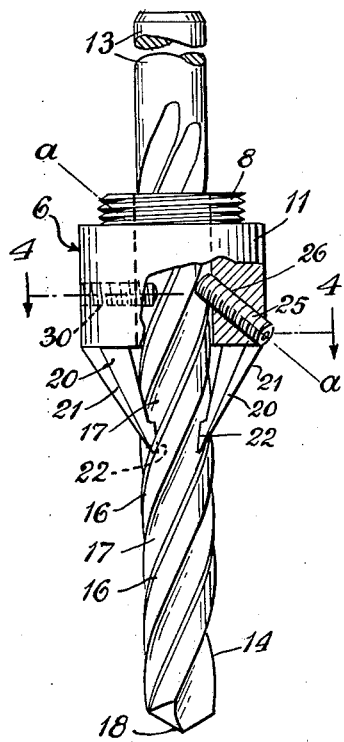
FIG. 2 is a side elevational view partly in section showing one of the end portions of the double countersinking attachment and illustrating the manner in which the cutting blades extend into diametral portions of the twist drill grooves and showing the set screw arranged at an angle to one of the side walls of the twist drill land at an angle of approximately 90°.
Figure 3:
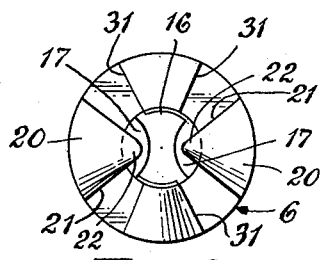
FIG. 3 is a bottom elevational view of the countersinking attachment showing the manner in which the cutters extend into the grooves of the twist drill.
Figure 4:
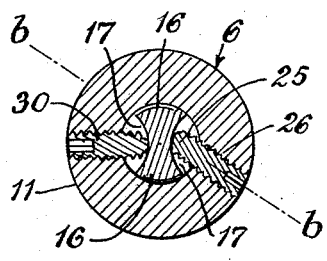
FIG. 4 is a cross-sectional view taken on line 4—4 of FIG. 2 and looking in the direction of the arrows to illustrate the manner in which the set screw is arranged offset and at an angle to a radial plane extending transversely of the drill axis.

In the drawing, and more in detail, attention is first directed to FIGURES 1 to 4 inclusive, wherein there is shown one embodiment of the invention and wherein the reference character 5 (FIGURE 1) generally designates a countersinking attachment for twist drills formed of separably connected sections generally designated 6 and 7. The sections 6 and 7 are threadedly or in any other manner connected as at 8 or, if desired, one section may be provided with a male member slidably and frictionally held in a female recess in the other member. The sections 6 and 7 may be applied to a twist drill or may be separated and used individually. When used as shown in FIG. 1, the attachment 5 can be reversed so that the countersink cutters generally designated 9 and 10 on the ends of the sections 6 and 7 respectively may be alternately used. Since both sections 6 and 7 are substantially identical in construction a description of one will suffice for both, and as shown in FIGURES 2 to 4 inclusive the collar section 6 includes a body portion 11 forming a collar and having a central opening 12 of a diameter to receive a conventional twist drill (FIG. 2) having a shank portion 13 and a twist drill portion 14. The drill portion 14 is formed by a pair of flutes 16 separated by diametrally opposed grooves 17 (FIGS. 3 and 4). The flutes are provided with the usual relief portions to permit the chips and cuttings to be removed during drilling. The collar 11 is provided on one end with a pair of countersinking cutters 20 having inwardly tapered cutting edges 21 and terminating at their lower ends in inwardly directed portions 22 adapted to enter the grooves 17 at diametrally opposed points as shown in FIG. 3. The counterboring cutters 20 are formed integral with the collar 11 and may be formed by machining the lower tapered end to provide opposed cut away portions to thus form the downwardly extending inwardly directed cutters 20.

The collar 11 is adjustably secured to the twist drill 13 by means of one or more Allen screws 25 which extend through a threaded bore 26 in the collar and at an angle as indicated by the line a—a which extends at an angle of approximately 45° to the axis of the twist drill 13 and engages one of the side walls or edges of one of the flutes at an angle of approximately 90° (FIG. 2). In addition, the set screw 25 extends at an angle b—b as shown in FIG. 4 to the axis of the twist drill 13 with the axis of the set screw 25 extending at an acute angle along the line b—b to the axis of the twist drill or a radial plane extending longitudinally thereof. An additional Allen set screw 30 may be arranged opposite the set screw 25 with its inner end engaging the opposite groove 17 and extending directly on a radii from the longitudinal center of the drill.

It will thus be seen that the set screw 25 extends at a compound angle along the lines a—a and b—b with respect to the axis of the set screw 30 and to the axis of the twist drill 13. This arrangement permits the collar 11 to be adjusted to various predetermined positions along the axis of the twist drill so that when the drill is used in forming tap holes and the like the countersinking cutters 20 will countersink the outer end of the bore hole with a high degree of accuracy and the elimination of burrs or feather edges at the point where the tapered countersunk opening merges with the bore hole. Additional cutting surfaces 31 may be formed on the collar 11 in the space between the diametrically opposed countersinking cutters 20.

Figure 5:
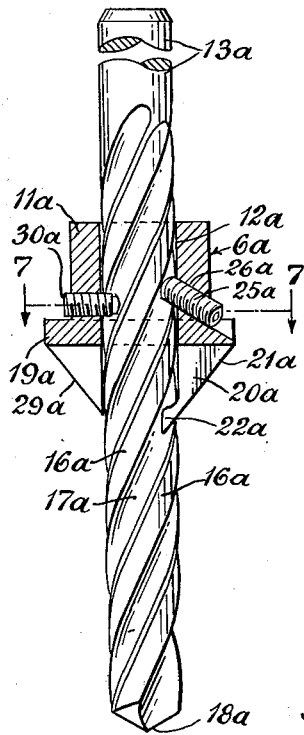
FIG. 5 is a side elevational view of a twist drill illustrating a modified form of the attachment in section and showing a single cutter on one end of the collar with its lower free end projecting into one of the grooves of the twist drill.
Figure 6:
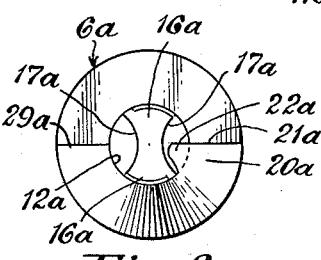
FIG. 6 is a bottom plan view of the modified form of the invention shown in FIG. 5.
Figure 7:
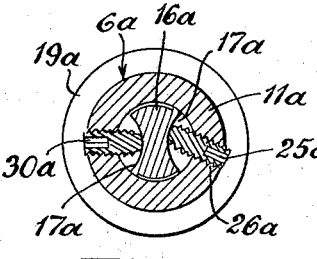
FIG. 7 is a transverse cross-sectional view taken on line 7—7 of FIG. 5, and further illustrating the manner in which the set screw is arranged at an angle offset from the axis of the drill.

In the modified form of the invention shown in FIGS. 5 to 7 inclusive there is shown a countersinking attachment similar to that shown in FIGS. 1 to 4 inclusive, but provided with a single countersinking and counterboring cutter. As shown in FIG. 5, the drill 13a is of conventional design and includes opposed flutes 16a and opposed grooves 17a with the lower end terminating in a cutting point 18a. The attachment generally designated 6a includes a body portion shaped to provide a collar 11a which is adapted to be used individually on a twist drill 13a and the collar is provided with a central opening 12a of a suitable diameter corresponding to the diameter of the twist drill. One end of the collar 11a is provided with an enlarged portion 19a, the underside of which is machined to form a single countersinking cutter blade 20a with the opposite side machined as shown at 29a. The single cutter 20a is provided with an inwardly directed conical surface 21a similar to the cutting blade 20 shown in FIGS. 1 to 4 inclusive and the lower end of the cutting blade 20a is provided with an inwardly directed portion 22a adapted to extend into one of the grooves 17a of the twist drill 13a with its inner surface engaging the flute edge 16a.

The operation of the modified form of the invention shown in FIGS. 5 to 7 inclusive is similar to that shown in FIGS. 1 to 4 inclusive and the collar 6a is held in place at various positions with respect to the longitudinal axis of the twist drill by means of one or more screws 25a received each in a threaded bore 26a extending through the collar 11a on a compound angle identical to that described in FIGS. 1 to 4 inclusive, and arranged directly opposite the set screw 25a is a radially extending Allen set screw 30a. The cutting edge 21a of the cutter 20 engages the work to form a countersink in the workpiece in the area adjacent the drilled opening formed by the twist drill 13a, and in view of the fact that the end 22a projects under the cutting lip of one of the flutes in the same manner as described in FIG. 2, a clean and neat tapered countersink opening will be formed adjacent the bore hole with the elimination of ragged or torn edges at the point where the tapered surface of the countersink opening merges with the wall of the bore hole.

In the form of the invention shown in FIG. 8 the collar 6b is substantially the same as before and includes a body portion shaped to provide a collar 11b having a central opening 12b to receive a twist drill similar to that shown in FIGS. 2 and 5. The countersink cutters 20b are formed on one end of the collar and extend in a direction parallel to the axis of the twist drill or the central opening 12b. The cutters 20b are helically curved in a direction opposite to the direction of rotation to provide cutting lips 21b, and the end portions of the countersinking cutters 20b terminate in end portions 22b which are adapted to project into the opposed grooves of the twist drill as described in connection with the form of the invention shown in FIG. 2.

Allen set screws 25b are arranged and received in threaded openings in the collar 11b as before, and radial Allen set screws 30b are similarly mounted in radial threaded openings in the collar directly opposite the end of the set screw 25b.

In the modified form of the invention shown in FIG. 9 the attachment includes a fixture 6c including a body portion shaped to provide a collar 11c having a central opening 12c of a diameter to accommodate a twist drill. One end of the collar 11c is shaped to provide a conical portion 20c which may be provided on its conical surface with circumferentially spaced cutting blades 21c. The bore 12c in the collar extends into the conical portion 20c as at 40 and terminates in an opening 41 indicated by dotted lines and shaped to conform to the groove twist of the drill. Thus, knob portions 42 indicated by dotted lines project into the grooves of the twist drill since the opening 41 conforms in shape to the sectional shape of the drill and provides a spiral passage which is received on the twist drill and threadedly engages the same. An Allen set screw 25c is also provided.

It is to be understood that the various forms of the invention shown and described are to be taken as preferred embodiments thereof and that various changes may be made without departing from the spirit of the invention or the scope of the subjoined claims.

What I claim is:

1. In a countersinking attachment for twist drills, a collar having a central opening for receiving said drill, a longitudinally extending tapered projection on said collar forming a countersink cutter and having a portion projecting into the groove of said twist drill with the taper line of said cutter intersecting the flute circle of said drill, and means for adjustably securing said collar to said drill, said means including a threaded fastener received in a correspondingly threaded opening in said collar and extending at a compound angle with respect to axial and transverse planes passing through the drill axis.

2. In a countersinking attachment for twist drills, a two-part collar separably connected and having aligned bores for receiving the twist drill, a tapered projection on one end of each section forming a countersinking cutter with the free end of said cutter extending into one of the grooves of said twist drill, and set screw means for anchoring said collars in place said set screw means including a radially arranged set screw and an opposed set screw extending at an acute angle to the longitudinal axis of said drill.

3. In a countersinking attachment for twist drills, a collar having a central bore for receiving said drill, a pair of longitudinally extending tapered countersinking cutters on one end of said collar with their free ends extending inwardly and into diametrally opposed grooves in the twist drill, threaded coupling means on the opposite end of said collar and set screw means for adjustably anchoring said collar on said drill said set screw means including a radially arranged set screw and an opposed set screw extending at an acute angle to the longitudinal axis of said drill.

4. In a countersinking attachment for twist drills, a collar having a central bore for receiving said drill, a single longitudinally extending projection on one end of said collar having an inwardly tapered cutting edge terminating at its free end in an inwardly extending projection adapted to be received in one of the grooves of said twist drill, and threaded fastener means for anchoring said collar to said drill said set screw means including a radially arranged set screw and an opposed set screw extending at an acute angle to the longitudinal axis of said drill.

5. In a countersinking attachment for twist drills, a collar having a central bore for receiving said drill, a pair of longitudinally extending tapered projections on one end of said collar having portions projecting into the confines of said bore to be received in the opposed grooves of said twist drill between the cutting flutes thereof and means for adjustably securing said collar to said drill, said means including oppositely arranged set screws, one of which extends at an acute angle to said drill axis, said longitudinally extending countersink cutters being helically curved in a radial direction from the axis of the collar and extending in a direction opposite to the direction of drill rotation.

6. In a countersinking attachment for twist drills, a collar having a central bore for receiving said drill, a tapered and conical projection on one end of said collar having a bore for receiving said drill and a spiral passage at one end of said bore conforming to the cross-sectional shape of said drill to provide portions of said conical projection extending into the grooves of said drill, and threaded fastener means for anchoring said collar to said drill, said threaded fastener means including a radially projecting set screw and an opposed set screw extending at an acute angle to the longitudinal axis of said drill.

7. In a countersinking attachment for twist drills, comprising a collar having a bore for receiving said drill, a countersink cutter on said collar to cooperate with said drill and a set screw received in a threaded opening in said collar and arranged on a compound angle with respect to the axis of said drill and a radial plane passing through the drill axis and intersecting said set screw, said set screw being adapted to prevent movement of said collar in a direction opposite to the drill point when the countersinking portion of said collar moves into operative engagement with the workpiece in the area surrounding the opening formed by said drill.

8. In a counterboring attachment for twist drills, a collar having a central bore for receiving said drill, cutting teeth on one end of said collar and portions at one end of said bore conforming to the cross-sectional shape of the grooves on said drill and extending into said grooves, and threaded fastener means for anchoring said collar to said drill, said fastener means including threaded fasteners received in opposed threaded openings of said collar with one of said threaded fasteners extending at a compound angle to a plane passing through the longitudinal axis of said drill.

9. In a counterboring attachment for twist drills, a body portion forming a collar having a bore to receive the twist drill, counterboring cutters on one end of said collar, a set screw threadedly received in said collar and extending into one of the grooves of the drill to engage at least one side of a groove at an angle of approximately 90° therewith, and another set screw threadedly received in said collar and disposed diametrically opposite said first named set screw and extending at a compound angle with respect to a longitudinal and transverse plane passing through the drill axis.

References Cited in the file of this patent

UNITED STATES PATENTS

| | | |
|---|---|---|
| 2,692,519 | Wolff | Oct. 26, 1954 |
| 2,959,075 | Mueller | Nov. 8, 1960 |

FOREIGN PATENTS

| | | |
|---|---|---|
| 25,372 | Great Britain | 1911 |